United States Patent [19]

Hwang

[11] Patent Number: 5,038,576
[45] Date of Patent: Aug. 13, 1991

[54] AUTOMATIZED SPEEDY COOLANT JETTING DEVICE FOR THE CAR INTERIOR

[76] Inventor: Feng-Lin Hwang, No. 21, Pa Te Rd., Chi Tu District, Keelung City, Taiwan

[21] Appl. No.: 524,184

[22] Filed: May 16, 1990

[51] Int. Cl.⁵ .............................................. B60H 1/32
[52] U.S. Cl. ........................................ 62/244; 62/293; 62/304
[58] Field of Search ............... 62/304, 239, 244, 293; 239/274, 289

[56] References Cited

U.S. PATENT DOCUMENTS

| 2,199,485 | 5/1940 | De Vout | 62/121 X |
| 2,352,748 | 7/1944 | Whiteley | 62/304 X |
| 2,802,347 | 8/1957 | Marcus | 62/244 |
| 3,373,580 | 3/1968 | Federighi | 62/293 |
| 3,383,879 | 5/1968 | Tice | 62/293 |
| 3,680,467 | 8/1972 | Brook | 62/244 X |
| 4,813,238 | 3/1989 | Tan | 62/244 |

Primary Examiner—Lloyd L. King
Attorney, Agent, or Firm—Browdy and Neimark

[57] ABSTRACT

An automatic speedy coolant jetting device, comprising a container which including all related elements is installed in the central area beneath a car roof, a jet can loaded with speedy coolant, a starting gear to press the jet can's valve, a PC board integrated with a control circuit and a microswitch which is fixed behind the knob of the car door. With a shifter on the PC board arranged for conduction between the microswitch and the control circuit, when the car door is opened and the microswitch touched, the IC time control circuit is conducted open, and by way of a delay circuit set to delay a few seconds, the speedy coolant spraying will automatically start and continue till predetermined time is reached.

3 Claims, 4 Drawing Sheets

AUTOMATIZED SPEEDY COOLANT JETTING DEVICE FOR THE CAR INTERIOR

FIELD OF THE INVENTION

The present invention is related to an automatic speedy coolant jetting device, and which particularly, at the opening of the car door next time for use, will spray a speedy coolant out of its jet can, in both forward and rearward directions, to reduce the car's interior temperature if parked outdoors on a hot sunny day, to facilitate the immediate next car use.

BACKGROUND OF THE INVENTION

As we know, while a car is parked outdoors on a hot sunny day, its interior temperature will climb to an extremely high degree within minutes or hours, even though the car windows may have special papers to shield the sunshine. In this occasion, before the driver can use his car, he may have to open wide the car doors, turn on the air conditioning unit for cooling air to blow and wait for quite a long time until the high temperature therein is substantially reduced. But even on his next driving trip, the driver may still have to bear with sitting in a still quite high-temperatured seat and thereby be steamed sweaty. In order to solve the problem, some drivers apply a method of air extraction to try to equalize the car's interior temperature with the exterior, but receive an effect not as high as expected. For another solution, there appeared a speedy coolant sprayer in recent years which can lower down the temperature speedily in its spraying. But since its user has to bend down to enter the car and take it and hold it in hand to spray there under high temperature, he or she may already be pretty sweaty before starting next drive. Apparently improving the speedy coolant sprayer is necessary.

OBJECTS OF THE INVENTION

The main object of the present invention is to solve the above-said problem by providing an automatic speedy coolant jetting device. The device is installed in the central area beneath the car roof, and which, if its action switch is set for a predetermined time by driver before leaving his car, will be caused, at the next opening of the car door, to spray a speedy coolant out of its jet can in forward and rearward directions to reduce the car interior temperature speedily.

SUMMARY OF THE INVENTION

An automatized speedy coolant jetting device comprises a container which, including all related assembly members, is installed in the central area beneath a car roof, a jet can loaded with speedy coolant, a starting gear which drives the valve of the jet can to act to spray out the coolant, a PC board and a microswitch. By means of opening the car door the microswitch is touched, the control circuit of PC board is soon conducted open and a motor therein caused to operate. And by means of a reducing gear set which delivers a reducing speed from the motor, the follower thereof to which a driving arm is connected is thus brought along to do its turn. Then, the driving arm which contacts with the driven plate of the jet can may press down the driven plate, thereby actuating the valve and spraying coolant out of the jet can.

SPECIFIC DESCRIPTION

Figure 1:
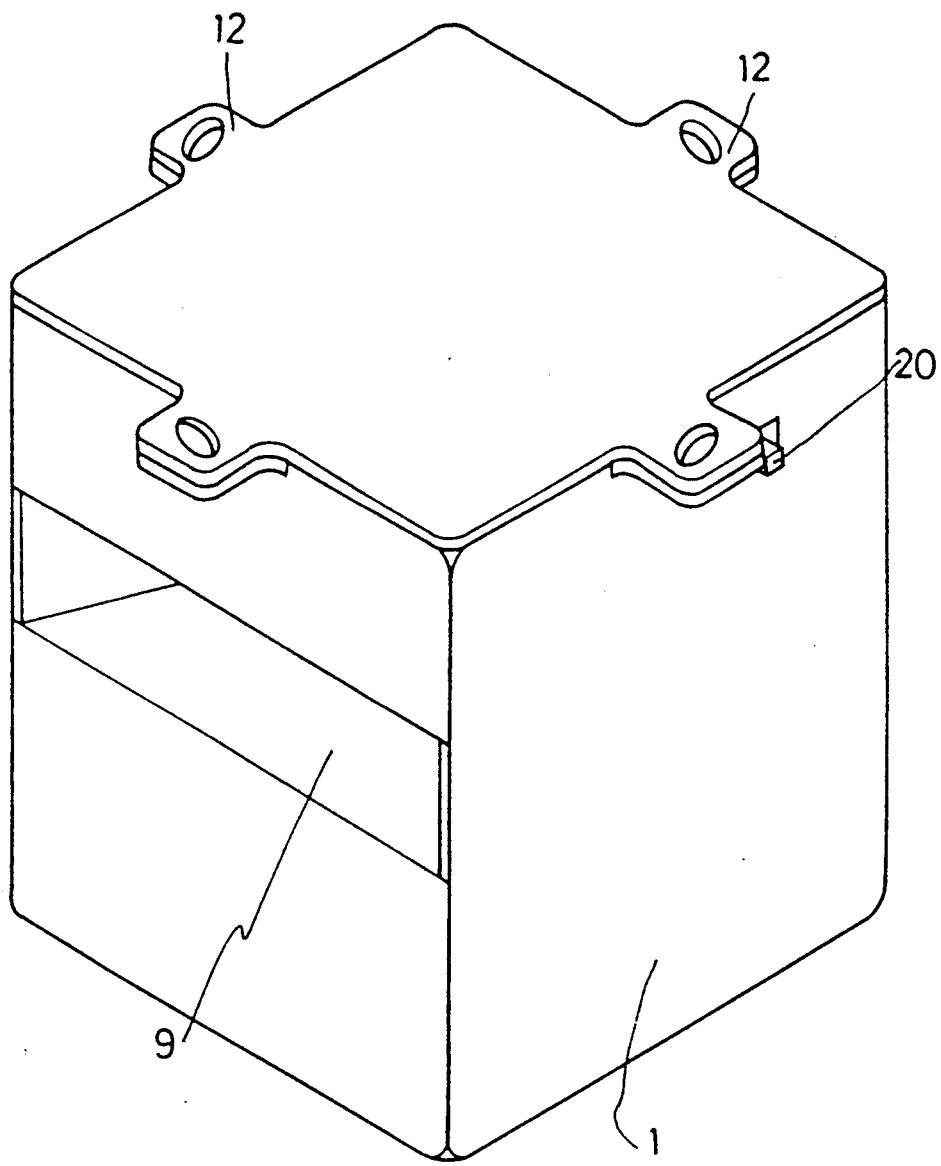
FIG. 1 is a perspective view of the invention.
Figure 2:
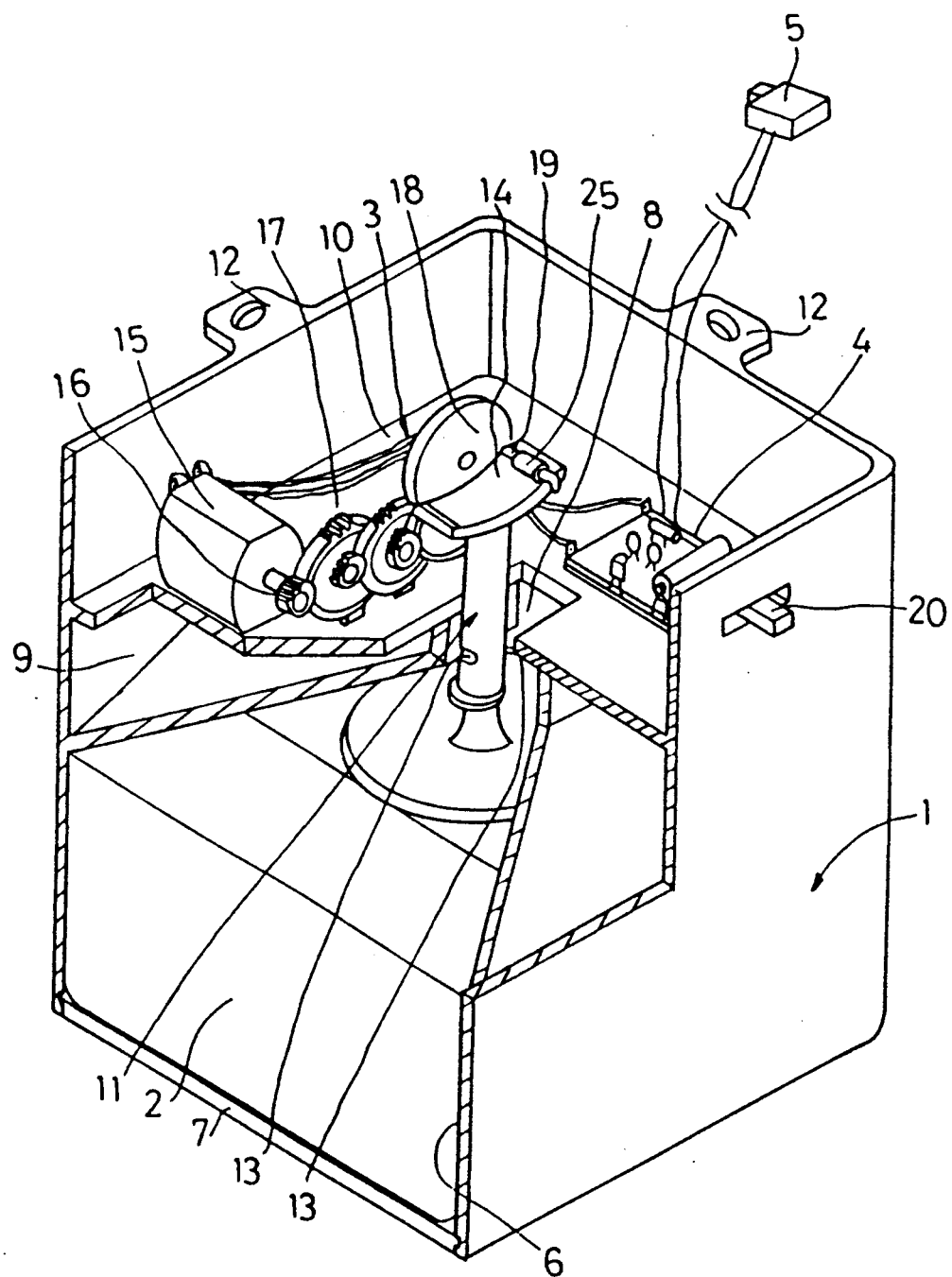
FIG. 2 shows the internal structure of the invention in FIG. 1 with part of its container cut away.
Figure 3:
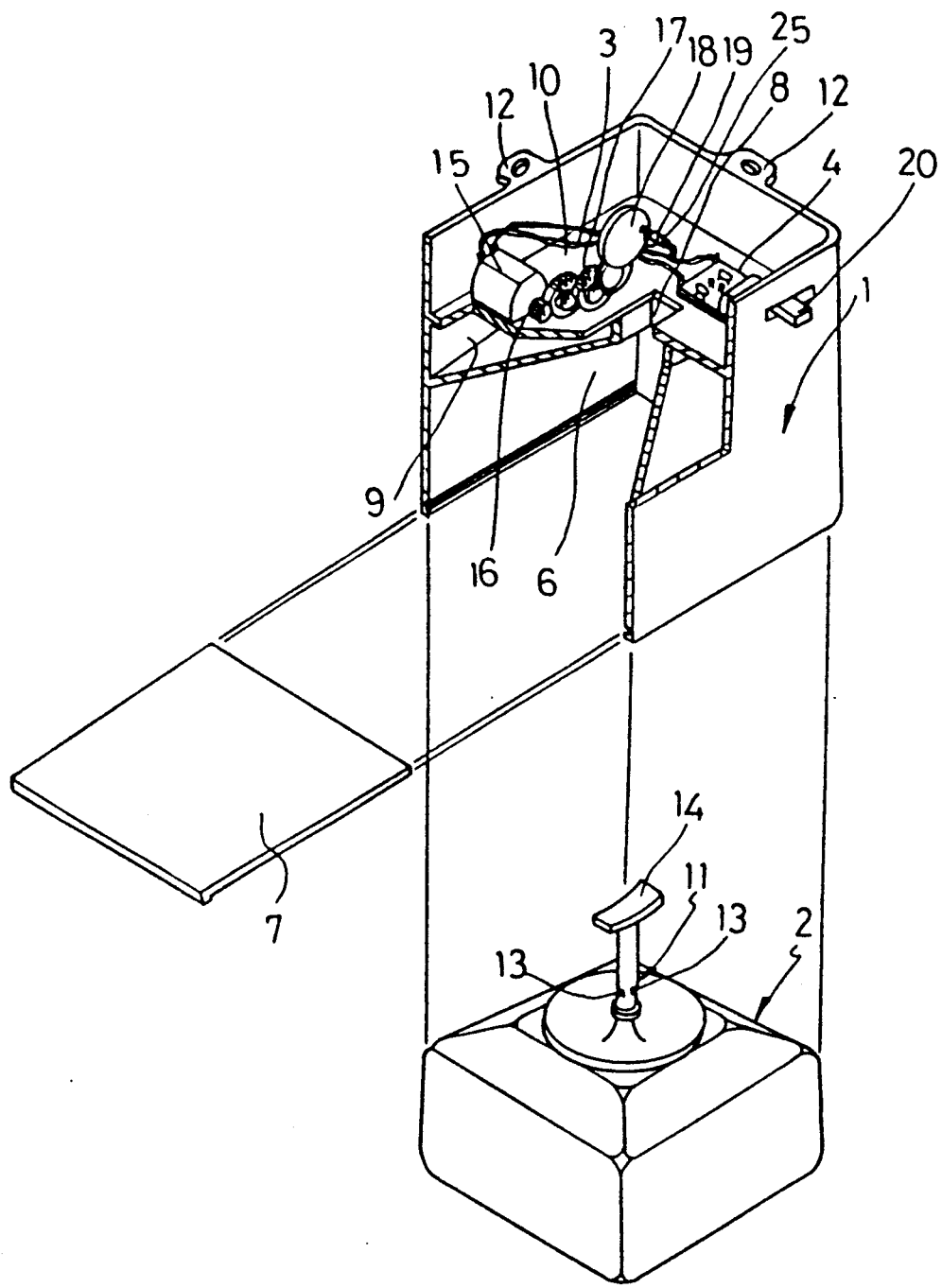
FIG. 3 is a locational exploded view of the internal structure of the invention in FIG. 2.

As FIG. 1–3 show, this invention comprises a container 1, a jet can 2, a starting gear 3, a PC board 4 and a microswitch 5. Wherein, container 1, of square or any other suitable shape, has a containing chamber (or lower chamber) 6 in its lower part thereof where jet can 2, entering from the open bottom thereof, is accommodated and closed up with cover plate 7 inserted thereto. At the top center of containing chamber 6, a passage 8 is created for communication with the cone part of flat, cone-shaped jet gate 9 which makes up a middle chamber, and the starting chamber or upper chamber 10 of the upper part of container 1, thereby allowing the valve 11 of jet can 2, when accommodated in containing chamber 6, to enter starting chamber 10 to become actuated. On two side walls of the upper part of containing chamber 6, flat, cone-shaped jet gates 9 are arranged in a symmetric manner so that the coolant sprayed will be guided this way, in forward and rearward directions, toward the upper respect of the car's front and rear seats (as FIG. 4 shows). In starting chamber 10, there are contained starting gear 3 and PC board 4, and arranged with set ears 12 along the top edge to enable it to be installed to the central ceiling area of the car roof. FIGS. 2, 3 show, the jet can, having a base of square or any other suitable shape, is loaded with a mixture of coolant liquid and jet-actuating air (not shown), and has a valve 11 extended from its upper side where orifices 13 are shown in a symmetric manner. With jet can 2 in container 1, valve 11 passes through passage 8 to enter starting chamber 10 and orifices 13 are put in direct face to the respective cone part of jet gates 9. The top end of jet can 2 is connected with a driven plate 14 which is in contact with a driving arm 19 connected to starting gear 3, so that when driven plate 14 is pressed down and, therefore, valve 11 is actuated, coolant liquid is sprayed out.

As FIG. 2 shows, starting gear 3, arranged on the bottom floor of starting chamber 10, has a motor 15 to whose output shaft is connected with a main gear 16 so as to drive reducing gear set 17 into operation. In action of the delivered reducing speed from motor 15, the follower 18 turns and a driving arm 19 connected thereof is brought to turn along, thereby occasionally pressing down driven plate 14 which is in contact with driving arm 19 to cause valve 11 to spray the coolant liquid out of orifices 13. Driving arm 19 is a small circular bar with one end vertically connected to the circumferential edge of follower 18, and sleeved with roller 25 so as to decrease the caused friction in its action of rolling contact against driven plate 14. Starting of the motor 15 is controlled by the IC time control circuit of PC board 4, shifter 20 and microswitch 5 fixed behind the knob of a car door. The IC time control circuit will automatically turn to be an open circuit after a predetermined time is set for the operation of motor 15, and will accord action of the driving arm 19 pressing driven plate 14 for that predetermined time. Shifter 20 commends conduction between microswitch 5 and the IC time control circuit. So, if shifter 20 is put at the "OFF" position in ordinary time; even if there is the action of opening the car door, no action from the IC time control circuit will occur. For car parking outdoors or in a hot sunny day, shifter 20 then should be put at the "ON" position, so that when the car door is opened the next time, the microswitch 5 touched will conduct open the IC time control circuit, and after a few seconds delay by the delay circuit, the coolant spraying will begin a will not automatically stop until the predetermined time is reached.

Figure 4A:
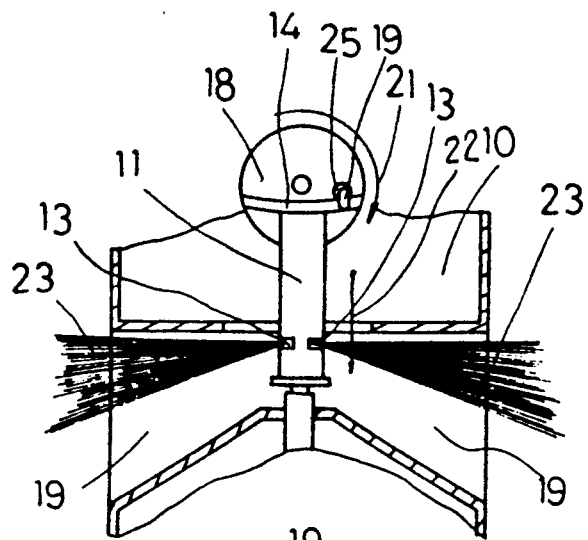
FIGS. 4A, 4B and 4C show in sequence the linked actions of the starting gear's driving arm and the jet can's driven plate of the invention.
Figure 4B:
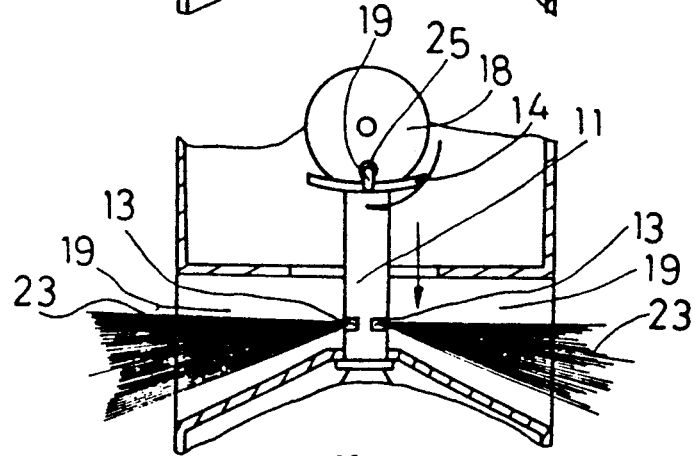
Figure 4C:
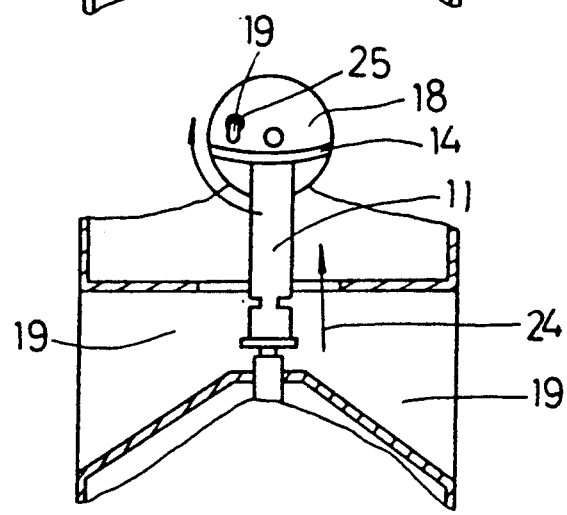

In FIG. 4, the linked action of the driving arm 19 of starting gear 3 and the driven plate 14 of jet can 2 is illustrated. As FIG. 4A shows, driving arm 19, which is brought by follower 18 to turn in a direction as arrow 22 indicates, will make contact with driven plate 4 and afterwards press the descending of valve 11 as arrow 22 shows, thereby spraying the coolant out of orifices 13, from jet gates 9 of container 1 to the front and rear respectively of the interior of the car. As shown in FIG. 4B, while the contact between driving arm 19 and driven plate 14 remains, so does the spraying of the coolant. In FIG. 4C, when driving arm 19 is disengaged from driven plate 14 of valve 11, driven plate 14 returns to normal in direction as arrow 24 shows and the coolant spraying from orifices 13 stops, waiting for the next time's contact to be make and to spray.

I claim:

1. An automatic speedy coolant jetting device for mounting to a central ceiling area of a car roof comprising:
   a container comprising separating walls defining lower, middle and upper chambers, said container being open below the lower chamber and closable by a cover plate, said container having installation ears along a top edge thereof for attachment of said container to the car ceiling;
   a jet can having a base mounted through the open lower chamber and fitted within the lower chamber, and a valve extending upwardly through openings in said separating walls whereby said valve extends through the middle chamber and into the upper chamber, said jet can being loaded with a mixture of a coolant liquid and a jet-actuating air, wherein said valve has at least two symmetrically arranged orifices maintained within the middle chamber, at least one of the separating walls defining the middle chamber being shaped to form a plurality of flat, cone shaped jet gates, and wherein said valve has, at a top end thereof, an arc driven plate;
   a starting gear and a PC board arranged on a bottom floor of said upper chamber, wherein said starting gear comprises:
   a motor having an output shaft;
   a main gear connected to the output shaft of said motor;
   a reducing gear driven by said main gear, which delivers a reducing speed;
   a follower having a driving arm able to press said arc driven plate of said valve, wherein said driving arm is a small circular bar having one end vertically connected to a circumferential edge of the follower and sleeved with a roller; and wherein said PC board is arranged with an IC time control circuit;
   a delay circuit; a shifter;
   wherein said PC board is connected through a power lead to a microswitch behind a handle of a car door and wherein the shifter commands that conduction be made between the control circuit and the microswitch; the microswitch able to conduct open the power source of the control circuit and, through the delay circuit, to start the motor whose operation is controlled, or stopped, by the IC time control circuit;
   whereby, when activated, the starting gear will actuate said valve causing coolant to be sprayed through the jet gates to effect cooling of the car.

2. The automatic speedy coolant jetting device of claim 1 wherein said container has a square cross-section.

3. The automatic speedy coolant jetting device of claim 2 wherein said jet can has a square cross-section.

* * * * *